(12) United States Patent
Thompson et al.

(10) Patent No.: US 6,271,508 B1
(45) Date of Patent: *Aug. 7, 2001

(54) SYSTEM AND METHOD FOR PROVIDING RF POWER TO A LOAD

(75) Inventors: Leslie L. Thompson, Houeoye Falls; Gary A. Schwenck, Rochester; Daniel J. Lincoln, Brockport, all of NY (US)

(73) Assignee: Ameritherm, Inc., Scottsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/528,182

(22) Filed: Mar. 17, 2000

Related U.S. Application Data

(62) Division of application No. 09/113,518, filed on Jul. 10, 1998.

(51) Int. Cl.$^7$ ............................................. H05B 6/08
(52) U.S. Cl. ..................... 219/663; 219/665; 219/666; 323/234; 323/364
(58) Field of Search ............................. 219/663, 665, 219/666, 667, 661, 670, 650, 779; 323/234, 355, 364

(56) References Cited

U.S. PATENT DOCUMENTS

| | | | |
|---|---|---|---|
| 2,813,186 | 11/1957 | Bock | 219/650 |
| 3,551,632 | 12/1970 | Geisel | 219/665 |
| 3,601,717 | 8/1971 | Kuecken . | |
| 3,686,460 | 8/1972 | Lamparter et al. | 219/663 |
| 3,842,358 | 10/1974 | Frazier . | |
| 3,921,092 | 11/1975 | Schatz . | |
| 4,017,701 | * 4/1977 | Mittelmann | 219/667 |
| 4,221,950 | 9/1980 | Lamberts et al. | 219/779 |
| 4,280,038 | 7/1981 | Havas et al. | 219/665 |
| 4,289,946 | 9/1981 | Yarwood et al. | 219/665 |
| 4,327,268 | 4/1982 | Frank | 219/665 |
| 4,375,051 | 2/1983 | Theall . | |
| 4,385,348 | * 5/1983 | Wisner | 219/663 |
| 4,445,167 | 4/1984 | Okado . | |

(List continued on next page.)

FOREIGN PATENT DOCUMENTS

| | | | |
|---|---|---|---|
| 0 619 692 A2 | 10/1994 | (EP) . | |
| 2 085 243 | 4/1982 | (GB) | H02M/7/42 |

OTHER PUBLICATIONS

"450 kHz Total Solid State RF Induction Heating," Ameritherm, Inc., 4 Pages, Jan. 1997.

"The Ameritherm 1 kW and 3 kW Radio Frequency Induction Heating Power Supplies," Ameritherm, Inc., 2 Pages, Mar. 1997.

(List continued on next page.)

Primary Examiner—Philip H. Leung
(74) Attorney, Agent, or Firm—Mintz, Levin, Cohn, Ferris, Glovsky and Popeo, P.C.

(57) ABSTRACT

An RF power supply that is capable of tracking rapid changes in the resonant frequency of a load and capable of quickly responding to varying load conditions so as to deliver the desired amount of power. The present invention also provides an RF power supply capable of delivering a wide range of power over a broad frequency range to a load that is remotely located from the power supply. According to one embodiment, the RF power supply includes a direct current (DC) voltage source that provides a DC voltage within a predetermined. voltage range; an amplifier, coupled to the DC voltage source, that provides an alternating voltage to a tank circuit connected to an output of the RF power supply; a frequency controller, coupled to the amplifier, to set the frequency of the alternating voltage produced by the amplifier, and a sensor, coupled to the load, to provide a signal to the frequency controller, where the frequency controller sets the frequency of the alternating voltage based on the signal received from the sensor.

11 Claims, 12 Drawing Sheets

U.S. PATENT DOCUMENTS

| | | |
|---|---|---|
| 4,471,196 | 9/1984 | Frank et al. . |
| 4,679,007 | 7/1987 | Reese et al. . |
| 4,769,519 * | 9/1988 | Hall ................................ 219/667 |
| 4,810,847 | 3/1989 | Ito ................................... 219/665 |
| 4,829,232 | 5/1989 | Erickson, Jr. . |
| 5,124,518 | 6/1992 | Lee . |
| 5,155,547 | 10/1992 | Casper et al. . |
| 5,191,302 | 3/1993 | Rossnick ......................... 331/109 |
| 5,329,439 | 7/1994 | Borojevic et al. . |
| 5,343,023 | 8/1994 | Geissler . |
| 5,383,019 | 1/1995 | Farrell et al. . |
| 5,431,664 | 7/1995 | Ureche et al. ................... 606/128 |
| 5,434,389 | 7/1995 | Griebel ............................ 219/665 |
| 5,438,498 | 8/1995 | Ingemi . |
| 5,441,596 | 8/1995 | Nulty . |
| 5,473,291 | 12/1995 | Brounley . |
| 5,638,034 | 6/1997 | Heikkilä et al. . |
| 5,688,357 | 11/1997 | Hanawa . |
| 5,757,247 | 5/1998 | Koukkari et al. . |
| 6,020,794 | 2/2000 | Wilbur . |
| 6,032,078 | 2/2000 | Rudie . |

OTHER PUBLICATIONS

"The Ameritherm 5 kW and 7.5 kW Radio Frequency Induction Heating Power Supplies," Ameritherm, Inc., 2 Pages, Jan. 1997.

"The Ameritherm 10 to 60 kW Radio Frequency Induction Heating Power Supplies," Ameritherm, Inc., 2 Pages, Jan. 1997.

"Ameritherm Precision Heating," Ameritherm, Inc., 10 Pages, Nov. 1996.

* cited by examiner

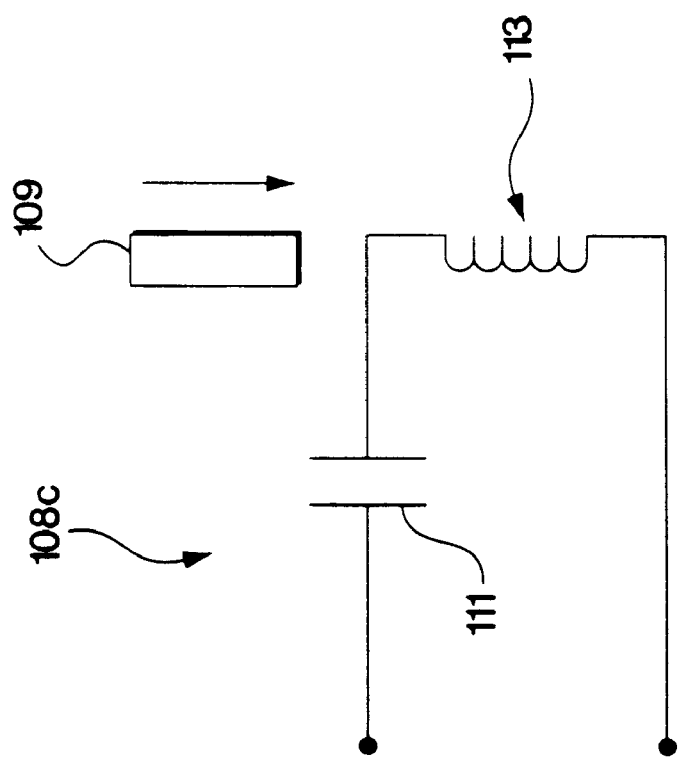
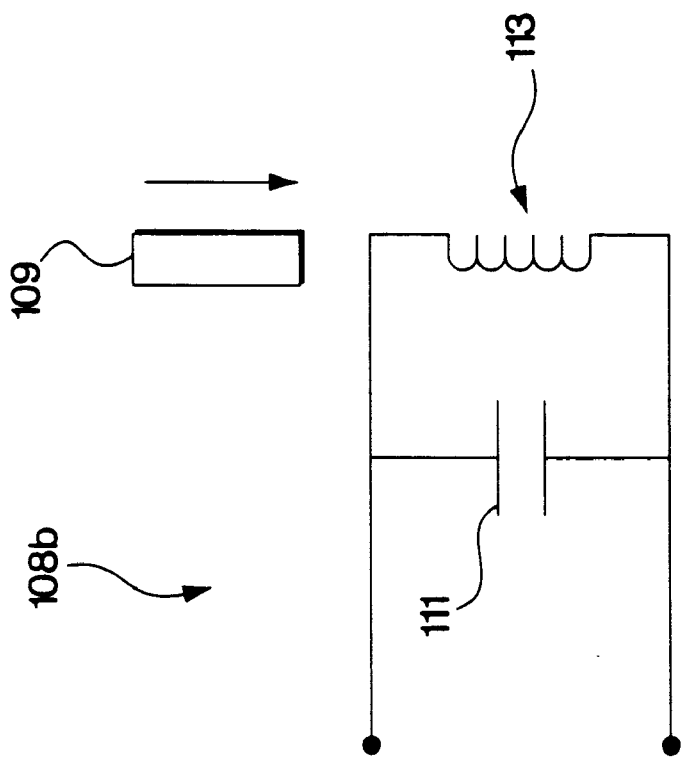

SYSTEM AND METHOD FOR PROVIDING RF POWER TO A LOAD

This application is a divisional of U.S. patent application No.: 09/113,518, filed on Jul. 10, 1998, the entire contents of which are incorporated herein by reference.

BACKGROUND OF THE INVENTION

1. Field of the Invention

The present invention relates generally to the field of radio frequency (RF) power supplies. The present invention is useful in induction heating and plasma applications, but by no means is limited to such applications.

2. Related Art

Induction heating is a method of heating electrically conductive materials such as metals. Induction heating relies on, as the name implies, inducing electrical currents within a material to be heated. These induced currents, called eddy currents, dissipate energy and bring about heating. Common uses of induction heating include heat treating, welding, melting, packaging and curing. The number of consumer items which undergo induction heating during some stage of their production is large and rapidly expanding.

Prior to the development of induction heating, gas and oil-fired furnaces provided the prime means of heating metals and nonmetals. The advantages that induction heating offers over furnace techniques are numerous. For example, greater heating rates can be achieved by induction heating than can be achieved by gas or oil furnaces. Higher heating rates lead to shorter heating times, which lead to productivity increases and reduced labor costs. Furthermore, given today's environmental concerns, induction heating is an attractive alternative to pollution producing furnaces.

The basic components of an induction heating system are (1) an AC power source (RF) power supply, (2) a tank circuit having an inductor coil and a capacitor, and (3) the material to be heated (a.k.a., "workpiece" or "load"). Common tank circuits used in induction heating are either parallel resonant or series resonant. A parallel resonant tank circuit includes a capacitance in parallel with the inductor coil and a series resonant tank circuit includes a capacitance in series with the inductor coil. A workpiece is heated by placing the workpiece within the inductor coil of the tank circuit and applying a high-power, RF alternating voltage to the tank circuit using the power supply. The alternating voltage applied to the tank circuit causes an alternating current to flow through the inductor coil. The flow of an alternating current through the inductor coil generates an alternating magnetic field that cuts through the workpiece placed in the inductor coil. It is this alternating magnetic field that induces the eddy currents that heat the workpiece.

A workpiece is heated most efficiently when the frequency of the alternating voltage applied to the tank circuit matches the tank circuit's resonant frequency. That is, when the tank circuit (i.e., the tank circuit with a workpiece placed in the inductor coil) is driven at its resonant frequency, the transfer of power from the power supply to the workpiece is maximized. Thus, heating of the workpiece at the resonant frequency yields the greatest heating efficiency.

It should be noted that the resonant frequency of the tank circuit is in part determined by the characteristics of the inductor coil, such as the size and shape of the coil, and the characteristics of the workpiece when the workpiece is placed in the coil. Hence, moving the workpiece through the coil or altering the characteristics of the workpiece by heating it will change the resonant frequency of the tank circuit. Because the resonant frequency of the tank circuit changes as the workpiece is heated or moved through the coil, induction heating systems utilize a power supply having a tuning system for continuously tracking the resonant frequency of the tank circuit. By tracking the resonant frequency of the tank circuit, the power supply is better able to provide an alternating voltage that matches the resonant frequency, thereby efficiently heating the workpiece.

A problem with conventional induction power supplies, however, is that they operate over a limited frequency band. Another problem is that they are not capable of delivering a power into a load that is remotely located from the power supply. Therefore, what is desired is an RF power supply that overcomes the above and other limitations of conventional RF power supplies.

SUMMARY OF THE INVENTION

The present invention provides an RF power supply that is capable of quickly responding to varying load conditions so as to deliver the desired amount of power to the load. The RF power supply according to the present invention can track rapid changes in the resonant frequency of a tank circuit. The present invention also provides an RF power supply capable of delivering a wide range of power over a broad frequency range to a load that is remotely located from the power supply. The ability to deliver a wide range of power over a broad frequency range is a significant advantage because it enables an operator of the RF power supply to efficiently heat a wide variety of work pieces without having to change any components of the RF power supply.

According to one embodiment, the RF power supply includes a DC voltage source that provides a DC voltage within a predetermined voltage range; an amplifier, coupled to the DC voltage source, that provides an alternating voltage to a circuit connected to the RF output of the RF power supply; a frequency controller, coupled to the amplifier, to set the frequency of the alternating voltage produced by the amplifier; and a sensor, coupled to the circuit, to provide a signal to the frequency controller, where the frequency controller sets the frequency of the alternating voltage based on the signal received from the sensor. In one embodiment, the circuit is a tank circuit.

In one embodiment, the voltage source receives an AC voltage and converts it to a DC voltage. Preferably, the DC voltage source includes a pulse width modulator with hysteretic current mode control. The advantage of using such a pulse width modulator is that the DC voltage that is provided to the amplifier remains constant regardless of variations in the load and regardless of changing AC line voltages or frequencies. This is advantageous because the desired power level will be delivered to the load even when the load varies, regardless of changing AC line voltages or frequencies. Another significant advantage is that the DC voltage source according to a preferred embodiment is able to rapidly vary its output voltage over a wide range, thereby providing a means for rapidly varying the power delivered to the load over a wide power range.

In one embodiment, the frequency controller includes a processor and a frequency synthesizer. The processor receives a sensor signal from the sensor and, based on the received sensor signal, sends a frequency control signal to the frequency synthesizer. The frequency synthesizer outputs an alternating voltage, where the frequency of the alternating voltage is controlled by the frequency control signal. The output of the frequency synthesizer is coupled to the amplifier. The amplifier produces an alternating voltage having the same frequency as the frequency of the signal outputted by the frequency synthesizer. In this manner, the frequency controller sets the frequency of the alternating voltage produced by the amplifier. The advantage of using a processor and frequency synthesizer to set the frequency of the alternating voltage produced by the amplifier is that it enables the RF power supply to (1) quickly respond to varying load conditions; (2) operate over a wide range of frequencies; (3) easily adapt to series and parallel resonant tank configurations; and (4) easily adapt to a wide variety of resonant sensing schemes, such as an admittance, an impedance, a current, or a reflected power resonant sensing scheme.

In one embodiment, the sensor is an admittance sensor and the sensor signal provided to the frequency controller represents an admittance of the tank circuit. The admittance sensor provides numerous advantages. For example, (1) the admittance sensor enables the RF power supply to track the resonant frequency during rapid voltage ramp periods and over a broad frequency range, and (2) because the admittance sensor is tolerant of various waveshapes encountered in RF transmissions, the admittance sensor can be located at the tank circuit, thereby allowing remote sensing. In another embodiment, the sensor is a forward and/or reflected power sensor, and the signal provided to the frequency controller represents the forward power, the reflected power, the ratio of the forward to reflected power, or the ratio of the reflected to forward power.

The present invention additionally provides a unique method for delivering RF power to a load. The method quickly determines the resonant frequency of the tank circuit and is able to track rapid changes in the resonant frequency. These and further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description; further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Figure 1A:
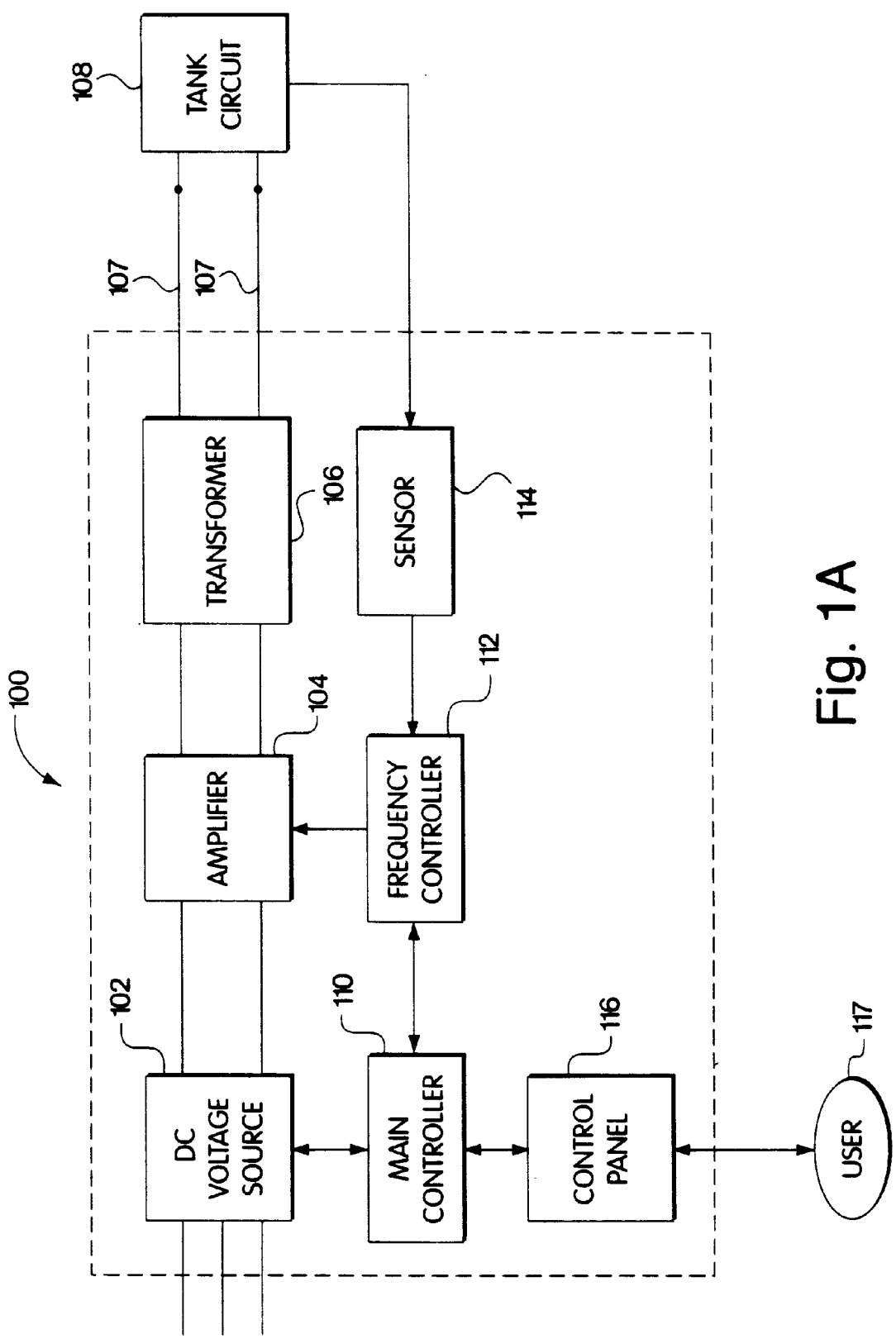
FIG. 1 illustrates an RF power supply according to one embodiment.
FIG. 1B is a diagram of one embodiment of a parallel resonant tank circuit.
FIG. 1C is a diagram of one embodiment of a series resonant tank circuit.

FIG. 1A is a block diagram illustrating the components of an RF power supply 100 according to one embodiment of the present invention. RF power supply 100 includes a direct current (DC) voltage source 102 for providing a controlled DC voltage to amplifier 104. Amplifier 104 receives a low voltage RF signal from frequency controller 112 and amplifies that RF signal to provide an alternating voltage to tank circuit 108. The power delivered to load 109 (see FIG. 1B) is determined by the frequency of the alternating voltage and the level of the DC voltage provided to amplifier 104.

In one embodiment, the DC voltage produced by DC voltage source 102 ranges between 0 and 350 volts, and the frequency range of frequency controller 112 is 1 KHz to 15 MHz. Consequently, RF power supply 100 is able to deliver a wide range of power over a wide frequency range. Furthermore. RF power supply 100 is able to deliver the wide range of power over the wide frequency range over long distance RF cables 107, thereby allowing tank circuit 108 to be remotely located from power supply 100. Additionally, frequency controller 112 and sensor 114 enable RF power supply 100 to track rapid changes in the resonant frequency and quickly respond to varying load 109 conditions so as to continuously deliver the desired amount of power to load 109. An embodiment of DC voltage source 102, amplifier 104, frequency controller 112, and sensor 114 will be described in more detail below with reference to the accompanying drawings.

DC Voltage Source 102.

In one embodiment, DC voltage source 102 receives an alternating current (AC) voltage from an AC power source (not shown). The DC voltage source 102 converts the AC voltage provided by the AC power source to a DC voltage. In one embodiment, the DC voltage produced by DC voltage source 102 ranges between 0 and 350 volts. A main controller 110 is coupled to DC voltage source 102 and a control panel 116. An operator of RF power supply 100 sets a desired voltage level via the control panel 116. The main controller 110 controls the voltage level of the DC voltage produced by the DC voltage source 102 according to the voltage level set by the operator. In a preferred embodiment, DC voltage source 102 is capable of maintaining a constant DC output voltage, current, or power (depending on the application's requirements) regardless of changes in load 109.

Figure 4A:
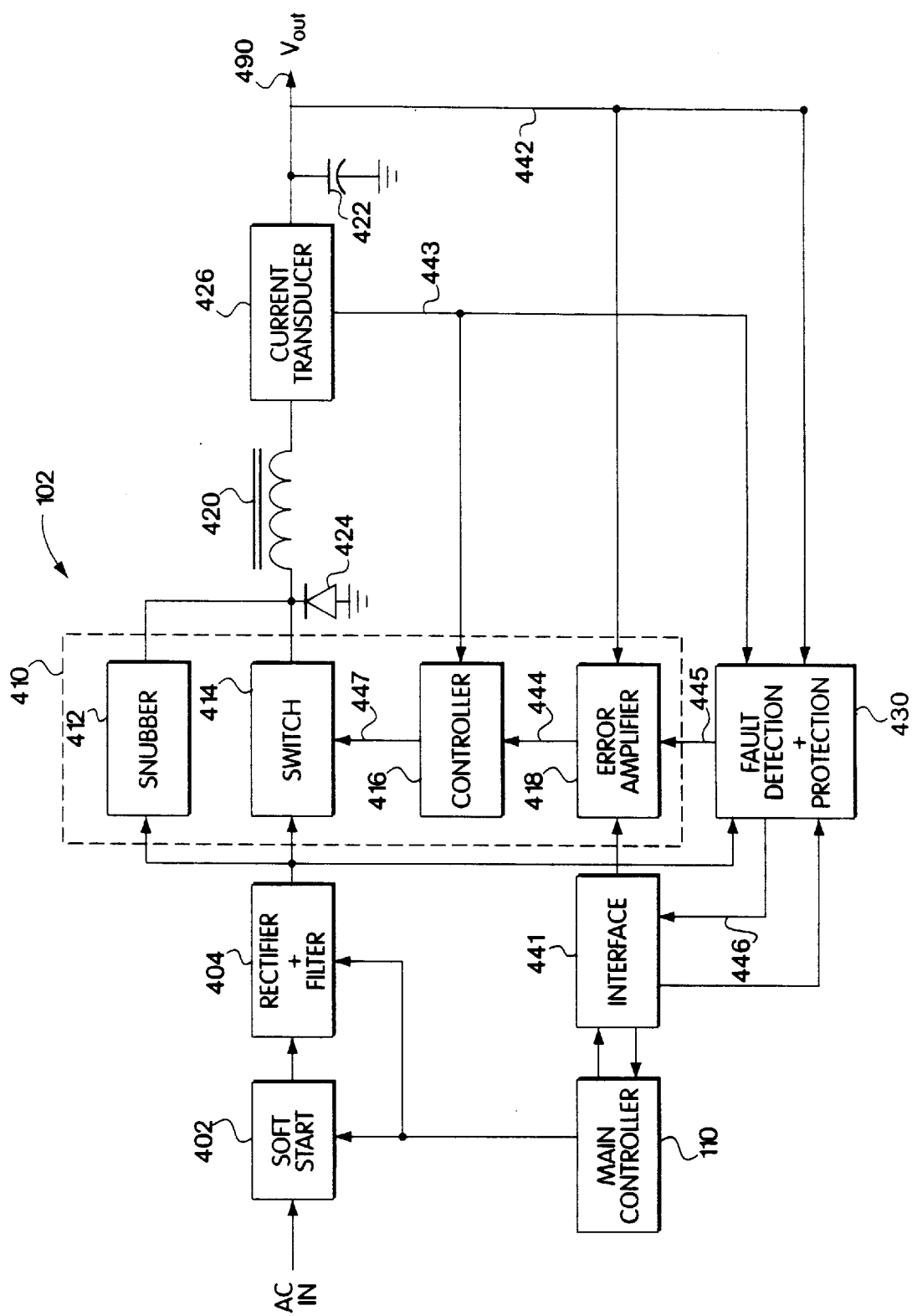
FIG. 4A illustrates a DC voltage source according to one embodiment.

FIG. 4A illustrates a preferred embodiment of DC voltage source 102. The design of DC voltage source 102 must take a variety of factors into consideration. For example, DC voltage source 102 must be capable of providing maximum current at any set output voltage from approximately 5% to 100% of maximum output voltage and it must quickly compensate for changing load conditions. In one embodiment, the maximum output voltage is 350 Volts. Additionally, DC voltage source 102 must be capable of ramping voltage up and down rapidly to provide controlled heat cycles when performing pulse/heating applications.

Furthermore, the ability to tightly regulate the output of DC voltage source 102 in a constant voltage, constant current, or constant power application is also highly desirable. High efficiency and power factor are also desirable goals.

The DC voltage source 102 illustrated in FIG. 4A is designed to meet the above requirements. The preferred embodiment of DC voltage source 102 illustrated in FIG. 4A is an off-line current mode buck regulator topology pulse width modulator. This configuration provides inherent short circuit protection and input ripple rejection, has simple loop stability design, and has instantaneous response to changes in load current.

Soft start circuit 402 is included. Soft start circuit 402 limits inrush currents to a reasonable level. In addition to this basic functionality, missing phase detection is performed to prevent the supply from turning on in the event of a missing phase. Conversion of the AC input to DC is performed in rectifier/filter circuitry 404. The rectified and filtered input voltage is then presented to the pulse width modulator (PWM) 410.

PWM 410 includes a Snubber 412, a Switch 414, a Controller 416, and an Error Amplifier 418. PWM 410 hard switches its DC input voltage at a controlled pulse width and duty cycle. These pulses of energy are then filtered through an inductor 420 and capacitor 422 to produce the desired output voltage 490. Preferably, inductor 420 has an inductance of 1.8 mili-Henries (mH) and capacitor 422 has a capacitance of 390 micro-Farads (uF) when the input voltage is 480 VAC.

A free-wheeling diode 424 is connected to switch 414 output to enable current to continue to flow through inductor 420 when switch 414 is off. To maximize efficiency and simplify drive requirements for the power levels provided by DC voltage source 102, an Insulated Gate Bipolar Transistor (IGBT) 470 (see FIG. 4B) was chosen for the switch 414. This device provides the turn-on characteristics of MOSFETS, and the superior saturation characteristics of a bipolar transistor.

Depending on the input voltage version of the supply, the basic design has been applied to power supplies providing up to 70 kilowatts at voltages to 350 VDC and currents to 200 amperes.

Figure 4B:
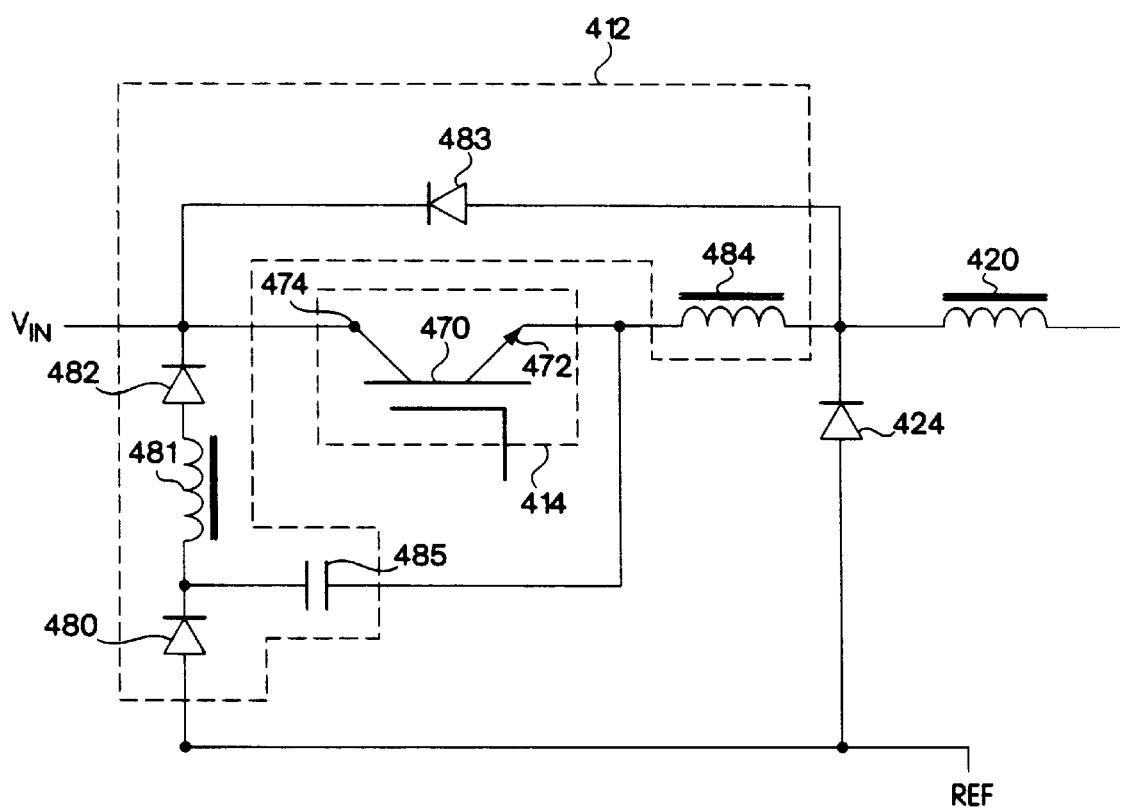
FIG. 4B illustrates a snubber circuit according to one embodiment.

FIG. 4B illustrates snubber circuit 412 according to one embodiment. The snubber circuit 412 is designed to provide zero current switching at the turn-on of switch 414, thereby minimizing the turn-on transition power dissipation normally associated with buck regulators due to the rate of voltage change, the reverse recovery current of the free-wheeling diode 424, and the current due to the load. Functionally, snubber circuit 412 shown in FIG. 4B delays the reverse recovery current of the free wheeling diode 424 from appearing on the switch 414 until the switch 414 is fully on. This prevents excessive power loss from occurring in the switch 414 during the ON time transition, as the recovery current is delayed until the switch 414 is fully on.

Snubber circuit 412, according to one embodiment, uses an inductor 484 to soften and delay the freewheeling diode 424 reverse recovery current, and a resonant LC snubber (481 and 485) to prevent voltage spikes on the switch output (emitter) 472 which would be caused by use of the inductor alone.

Starting with the switch 414 in the ON state, the following voltage/current conditions are present: the switch emitter 472 voltage is equal to Vin, which is the switch input (collector) 474 voltage. The current through inductor 484 is at maximum. Free-wheeling diode 424 cathode voltage is equal to switch emitter 472 voltage and the current through it is zero. The current through inductor 481 is zero. The voltage of capacitor 485 is at its negative peak, referenced to the switch emitter 472, and its current is zero. The capacitor 485 voltage is proportional to the current through inductor 484, based on equal energy, $\frac{1}{2}CV^2=\frac{1}{2}LI^2$.

When the switch 414 turns off, the current through switch emitter 472 falls to zero, and load current now circulates through inductor 484 via diode 480 and capacitor 485. Emitter 472 voltage transitions towards zero rapidly, until its voltage is equal to the peak voltage of the capacitor 485. At this point, the voltage starts decaying at a constant rate equal to the capacitor 485 current (which equals the constant current through inductor 484) divided by the capacitance (E/T=I/C). The capacitor 485 is charging from its negative peak towards its positive peak, starting from the initial emitter 472 turnoff. When the emitter 472 voltage crosses zero, the free-wheeling diode 424 turns ON, current through inductor 484 starts falling towards zero, the voltage across capacitor 485 is zero, and current in the free-wheeling diode 424 starts increasing towards the full load current. The capacitor 485 is now charged in a resonant mode by the energy in inductor 484 until its positive peak is reached.

At switch 414 turn-on the emitter 472 voltage rises rapidly to Vin and the capacitor 485 voltage starts decaying resonantly. In a classic buck regulator configuration, the free-wheeling diode 424 is connected directly to the switch emitter 472, and is turned on rapidly at the switch 414 turn-on point. Thus any diode reverse recovery current is seen immediately by the switch 414. In the snubber configuration according to one embodiment, diode 424 turn-on is delayed after switch 414 turn-on so that any reverse recovery current is not seen by the switch 414 until it is saturated. As an added benefit, diode 424 reverse recovery is softened by controlling the rate of change of turn off current (di/dt) through inductor 484. This is accomplished as follows: when the switch 414 turns on, current starts flowing through the switch 414 and inductor 484 at a di/dt rate of Vin/L, displacing the free-wheeling diode 424 current until maximum current is flowing through the inductor 484 and the diode 424 current is zero. Due to stored charge in the diode 424, negative current flows in the diode 424 until the stored charge is dissipated. When the diode 424 current reaches its negative peak, the diode 424 turns off, and its reverse recovery current transitions to the switch 414 at a time t=(LI/E) after switch turn-on. The energy stored in the diode 424 from the zero crossing to the negative peak is dissipated in the switch 414, with the remaining energy dissipated in the diode 424. Energy stored in the capacitor is transferred to inductor 481 and then back to the capacitor via a half-sinusoidal current pulse (resonant transfer at the frequency of the tank formed by capacitor 485 and inductor 481), circulating through the switch. Diode 482 blocks Vin from creating a DC offset in the snubber and diode 483 clamps transient voltage spikes occurring on a free-wheeling diode 424 to Vin.

Referring again to FIG. 4A, controller 416 provides the gating signal 447 for the switch 414. Preferably, controller 416 is a hysteretic current mode PWM integrated circuit. This device uses current feedback from the output inductor 420 to determine the operating frequency and uses voltage feedback to determine the output voltage.

When DC voltage source 102 is operating in a continuous mode, the ac ripple current in the output inductor 420 is triangular in shape. A current transducer 426 samples this ac ripple current, as well as the DC current in the inductor 420, and feeds a current feedback signal 443 to the controller IC 416. The desired peak-to-peak ripple current (Delta I) is maintained at a constant level by the hysteretic controller 416, which adjusts the switching pulse width and switching frequency of switch 414 to maintain Delta I at its predetermined value while also maintaining the preset output voltage 490.

Error amplifier 418 compares the desired output voltage level, which it receives from main controller 110 through communications interface 441, to an output voltage feedback signal 442 and generates an error signal 444 when a differential is present. When the output voltage 490 is lower than the desired output voltage level, the error signal 444 that is generated by error amplifier 418 will cause controller 416 to turn switch 414 ON. Conversely, when the output voltage 490 is higher than the desired output voltage level, the error signal 444 that is generated by error amplifier 418 will cause controller 416 to turn switch 414 OFF. In this manner the desired output voltage will be maintained.

Error amplifier 418, in conjunction with the Fault Detection and Protection block 430, also provides a current limiting function. When an overcurrent is detected by Fault Detection and Protection block 430, an overcurrent signal 445 is sent to the error amplifier 418, which adjusts the output voltage via error signal 444 to maintain the preset current limit.

Fault detection and protection block 430 continuously samples the input voltage, output voltage feedback signal 442, and output current feedback signal 443. If any of these signals go out of established limits, a fault signal 446 is generated and sent to the main controller 110 via communications interface 441. Upon receiving the fault signal 446, main controller 110 turns the system off.

Amplifier 104

Amplifier 104 is coupled to DC voltage source 102 and frequency controller 112. Amplifier 104 is also coupled to tank circuit 108 through transformer 106. The function of transformer 106 is to provide load isolation. Amplifier 104 provides an alternating voltage to tank circuit 108. The frequency of the alternating voltage provided to tank circuit 108 is controlled by frequency controller 112. The peak voltage level of the alternating voltage is determined by the output voltage 490 provided by DC voltage source 102. Amplifier 104, in one embodiment, includes a switch mode amplifier. Preferably, amplifier 104 includes a full-bridge switch mode amplifier having an inductive clamp topology, which is capable of recovering all reactive energy. Such a full-bridge switch mode amplifier is described in copending U.S. patent application No. 09/113,552, entitled "A System For Enabling a Full-Bridge Switch-Mode Amplifier to Recover All Reactive Energy," filed by Dan Lincoln on Jul. 10,1998, assigned to the assignee of the present invention and incorporated by reference in its entirety herein. In a preferred embodiment, amplifier 104 is able to deliver an alternating voltage having a frequency between 1 KHz and 15 MHZ to tank circuit 108. One skilled in the relevant art will recognize that there are a variety of amplifiers for producing alternating voltages, and that the present invention is not limited to any particular amplifier.

Frequency Controller 112

Frequency controller 112 is coupled to amplifier 104 and to tank circuit 108 through sensor 114. The function of frequency controller 112 is to track the resonant frequency of tank circuit 108 based on the output of sensor 114 and to control the frequency of the alternating voltage produced by amplifier 104 such that the frequency of the alternating voltage matches the resonant frequency of the tank circuit 108. By performing this function, the desired amount of power will be delivered to load 109 regardless of variations in load 109 that develop as power is delivered to load 109.

Frequency controller 112 tracks the resonant frequency by monitoring the output of sensor 114. Preferably, sensor 114 is an admittance sensor and the signal fed into frequency controller 112 from sensor 114 represents the admittance of tank circuit 108. In another embodiment, sensor 114 senses reflected and/or forward power. Both embodiments of sensor 114 are described in more detail in another section of this document.

The tank circuit 108 may be either a parallel resonant or series resonant tank circuit in combination with a workpiece 109. FIGS. 1B and 1C illustrate a parallel resonant tank circuit 108b and a series resonant tank circuit 108c, respectively. When the parallel resonant tank circuit 108b is driven at its resonant frequency the current flowing into the circuit is at a minimum and the voltage seen by the tank circuit 108b is at a maximum. Admittance (Y) is defined as current (I) divided by voltage (V)(Y=I/V). Thus, when the parallel resonant tank circuit 108b is driven at its resonant frequency, the tank circuit 108b has a minimum admittance. Consequently, the resonant frequency of parallel resonant tank circuit 108b can be determined by the frequency that produces the minimum admittance.

For the case where tank circuit 108 is a series resonant tank circuit 108c and the series tank circuit 108c is driven at its resonant frequency, the current flowing into the tank circuit 108c is a maximum and the voltage is a minimum (hence, the admittance is a maximum). Thus, for the series resonant tank circuit 108c, the resonant frequency can be determined by the frequency that produces the maximum admittance value.

Figure 2:
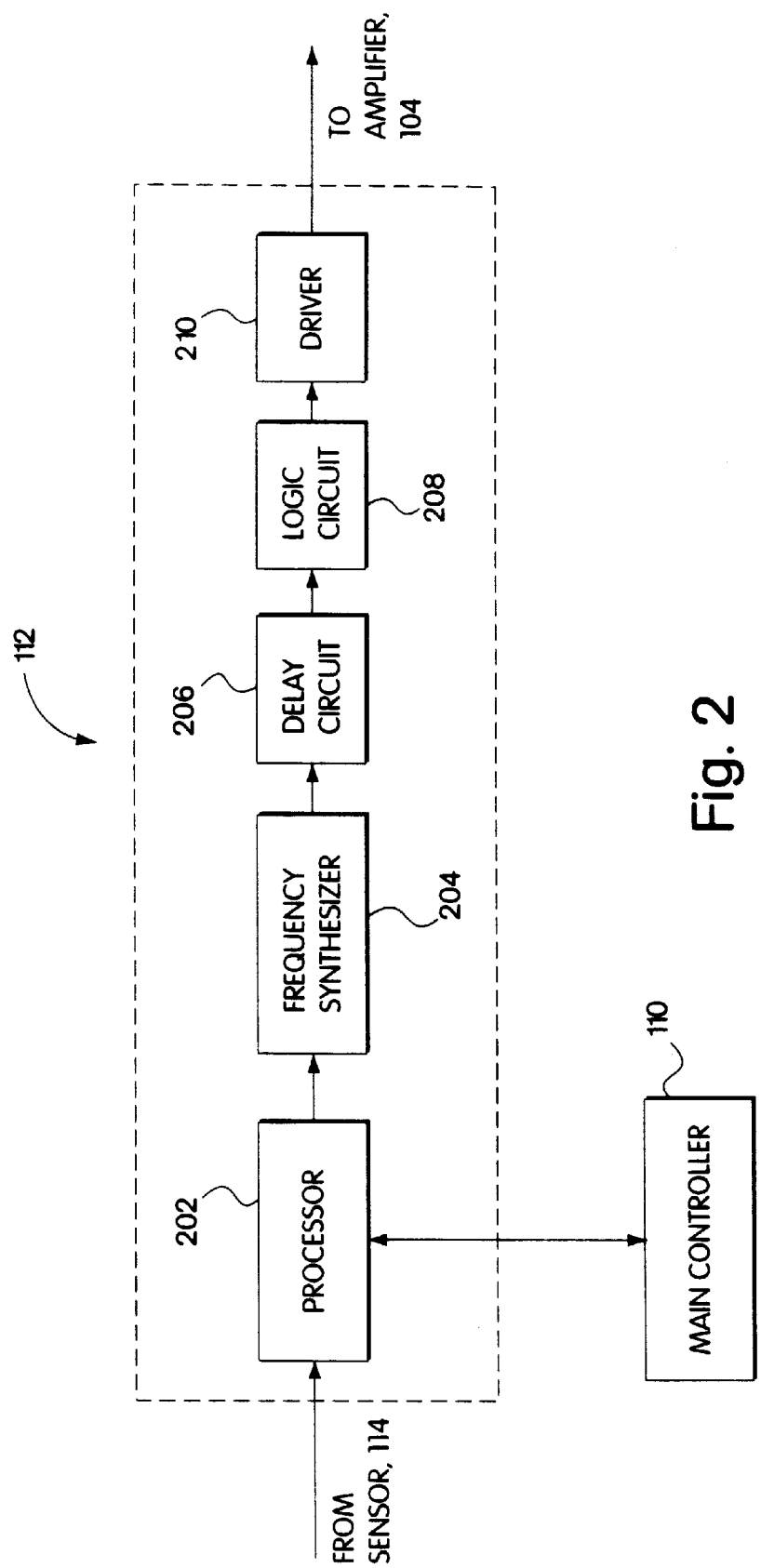
FIG. 2 illustrates a frequency controller according to one embodiment.

FIG. 2 illustrates one embodiment of frequency controller 112. As shown in FIG. 2, one embodiment of frequency controller 112 includes: a processor 202 for tracking the resonant frequency of tank circuit 108 and controlling the frequency of the alternating voltage; a frequency synthesizer 204 for generating a signal having a frequency between 0 and 20 MHZ; a digital delay device 206; a logic device 208; and a driver 210. Preferably, frequency synthesizer 204 is a direct digital synthesizer (DDS).

Figure 7A:
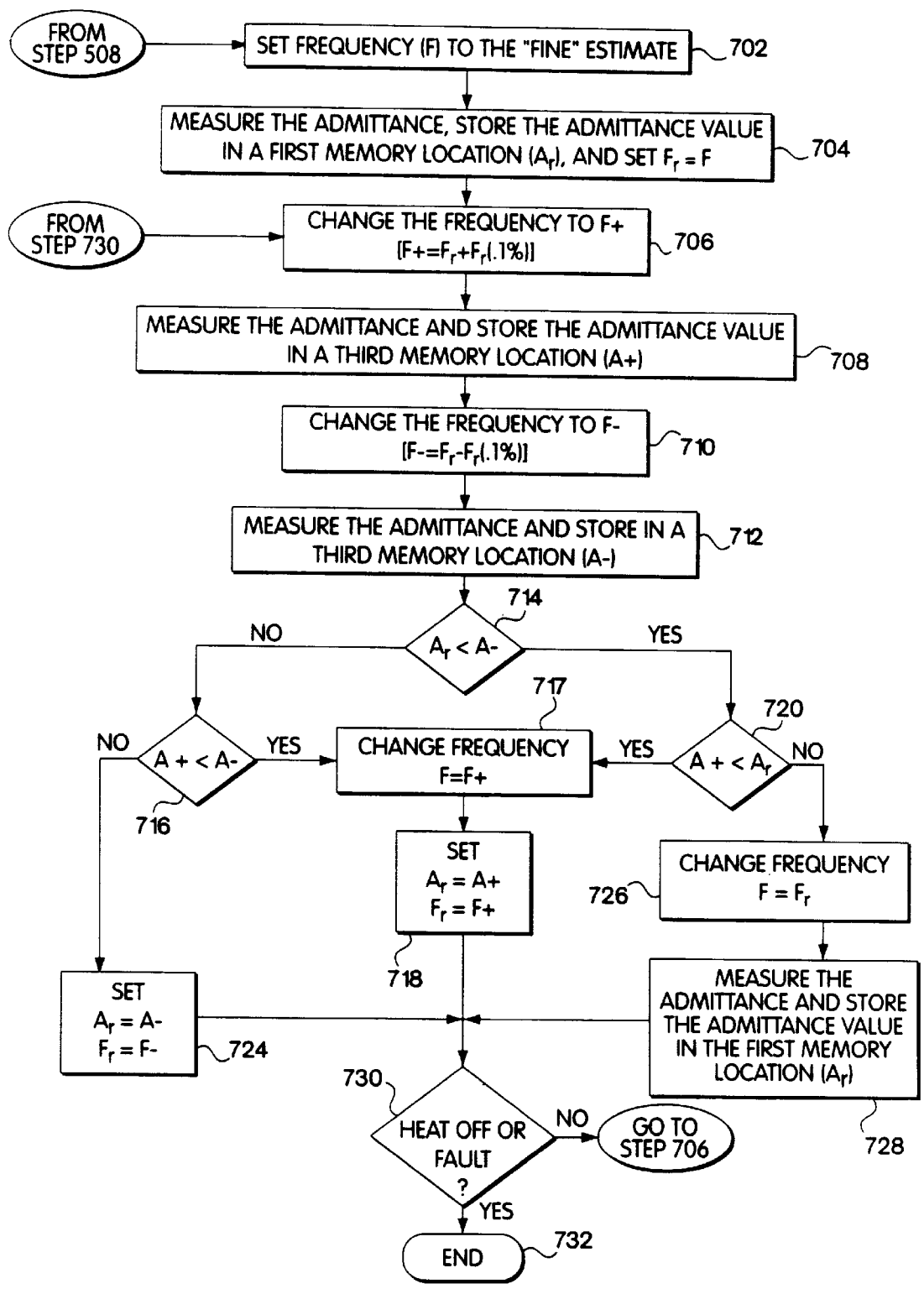
FIG. 7A illustrates a resonant frequency tracking process according to a first embodiment.
Figure 7B:
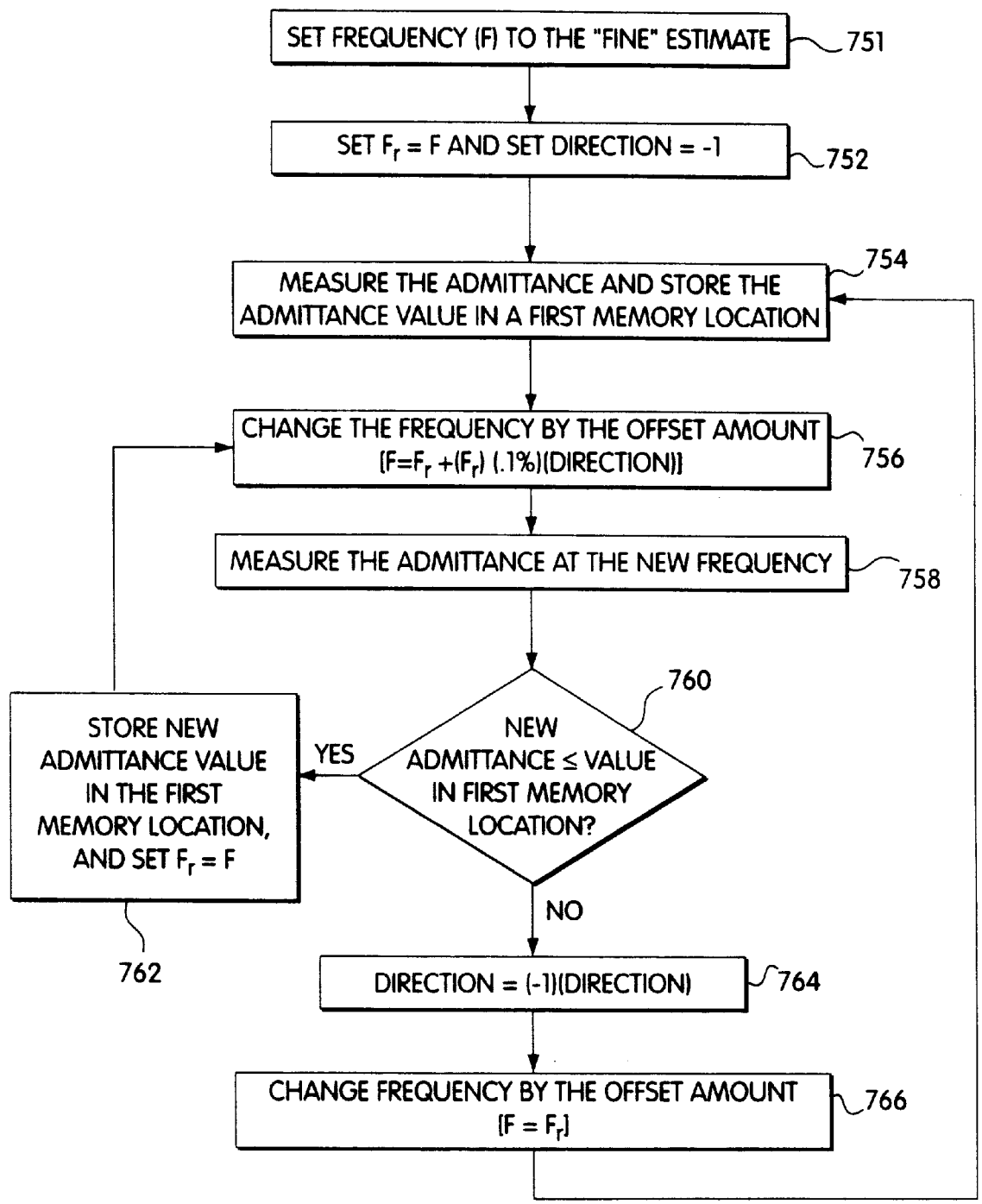
FIG. 7B illustrates a resonant frequency tracking process according to a second embodiment.

Based on signals received from sensor 114, processor 202 determines and tracks the resonant frequency of tank circuit 108 and directs frequency synthesizer 204 to output a signal having a frequency matching the resonant frequency. FIGS. 7A and 7B each illustrate a procedure that can be performed by processor 202 for tracking the resonant frequency (these procedures will be described in more detail below). The output of frequency synthesizer 204 is coupled to amplifier 104 through delay circuit 206, logic circuit 208, and driver 210. Digital delay device 206 and logic device 208 are used to generate two gating signals that are 180 degrees out of phase with respect to each other. The frequency of the gating signals outputted from logic device 208 matches the frequency of the signal fed to digital delay circuit 206 from frequency synthesizer 204. The output of logic device 208 is fed to a driver circuit 210 that provides the gating signals to the switches within amplifier 104. Amplifier 104 produces an alternating voltage having a frequency that matches the frequency of the signal produced by the frequency synthesizer 204. In this manner, the frequency controller ensures that the amplifier will drive the tank circuit 108 at the load's resonant frequency. In one embodiment, logic device 208 is a complex programmable logic device (CPLD). In another embodiment, logic device is a processor controlled by the appropriate software. An advantage of the frequency controller according to the preferred embodiment is that it is able to track rapid changes (e.g., 2 KHz/millisecond) in the resonant frequency of tank circuit 108.

Sensor 114.

As stated above, Preferably, sensor 114 is an admittance sensor that provides a signal representative of the admittance of tank circuit 108 to processor 202. In other embodiments, sensor 114 could be a current, voltage, phase, impedance, or forward/reflected power sensor.

Figure 3A:
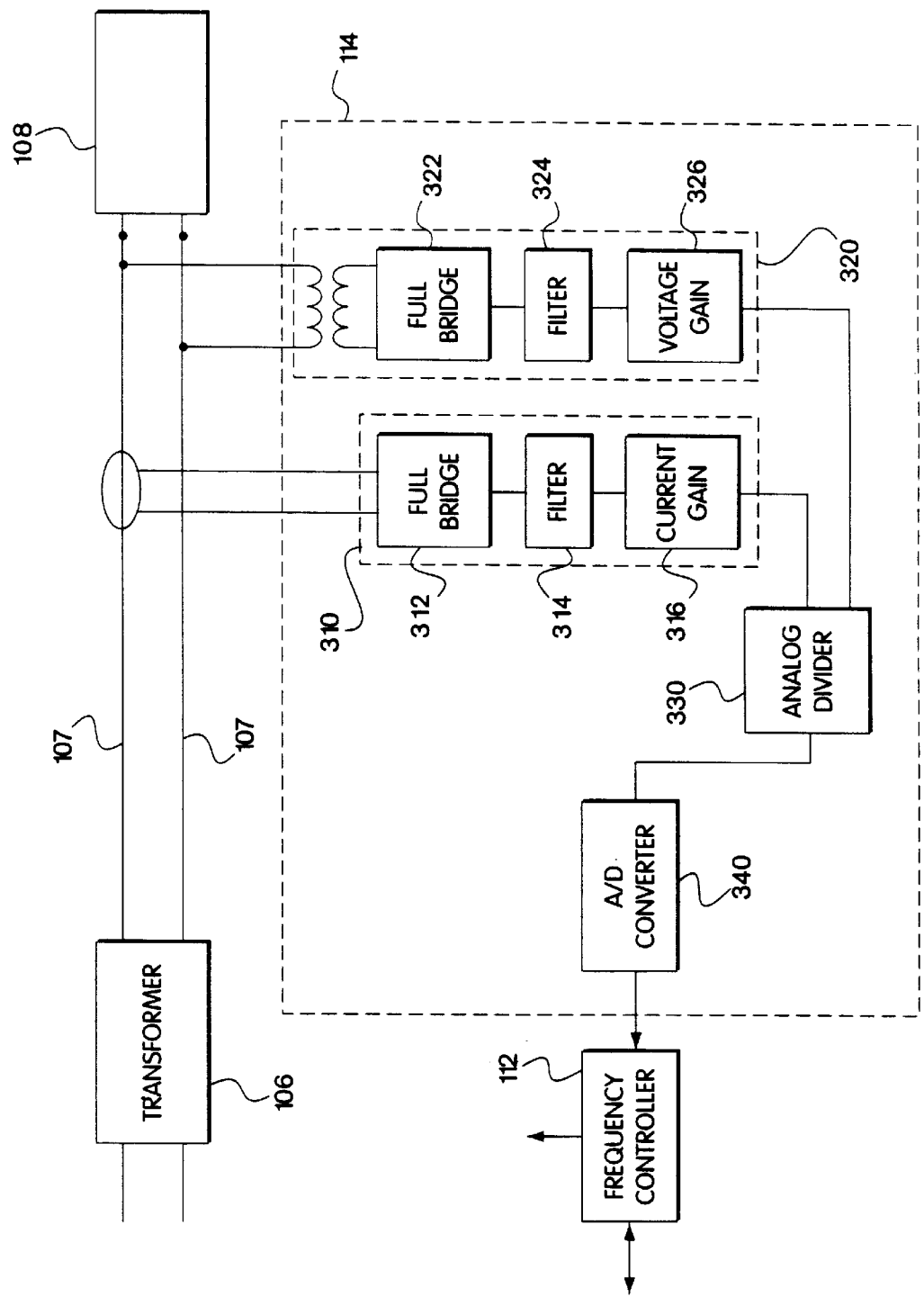
FIG. 3A illustrates a sensor according to a first embodiment.

FIG. 3A illustrates a preferred embodiment of sensor 114. A preferred embodiment of sensor 114 includes a current sensor 310 and a voltage sensor 320 for measuring the current flowing into tank circuit 108 and the voltage seen by tank circuit 108, respectively, so that the admittance of tank circuit 108 can be determined. A preferred embodiment of sensor 114 further includes analog divider 330 to receive a signal from current sensor 310 and voltage sensor 320 and to output a signal representing the admittance of tank circuit 108. This admittance signal is converted to a digital signal by A/D converter 340 and fed into frequency controller 112.

In one embodiment, current sensor 310 includes a full wave bridge 312, a filter 314, and a current gain stage 316. Similarly, voltage sensor 320 includes a full wave bridge 322, a filter 324, and voltage gain stage 326. Full wave bridges 312, 322 produce a rectified current signal and voltage signal, respectively. The rectified current signal is filtered to produce an average current signal and the rectified voltage signal is also filtered to produce an average voltage signal. The average current and voltage signals are then scaled by current gain stage 316 and voltage gain stage 326, respectively. The current gain stage 316 and voltage gain stage 326 are set such that the output of analog divider 330 is approximately 40% of the maximum allowable voltage for Analog to Digital (AID) converter 340 when the admittance of tank circuit 108 is equal to a nominal admittance. The nominal admittance is based on the maximum power that can be delivered to load 109 when DC voltage source 102 is operating at its maximum output voltage of 350 volts. The output of analog divider 330 was optimized to this nominal admittance to give a 100 to 1 dynamic admittance range, thus allowing frequency controller 112 to find the resonant frequency for tank circuit 108 having a quality factor (Q) ranging from 3 to 200. By changing either the voltage gain stage 326 or current gain stage 316, frequency controller 112 will be able to operate with either higher or lower Qs. Preferably, current sensor 310 and voltage sensor 320 are placed at the tank circuit 108. That is, current sensor 310 and voltage sensor 320 are connected at the far end of RF cables 107, as is shown in FIG. 3, so that the effects of RF cable 107 are min d thereby assuring an accurate admittance reading of tank circuit 108. RF cables 107 are used to remotely locate the tank circuit 108 from the power supply. In one embodiment, RF cables can have a length of 200 feet without significantly effecting the delivery of power from the power supply 100 to the load 109.

Figure 3B:
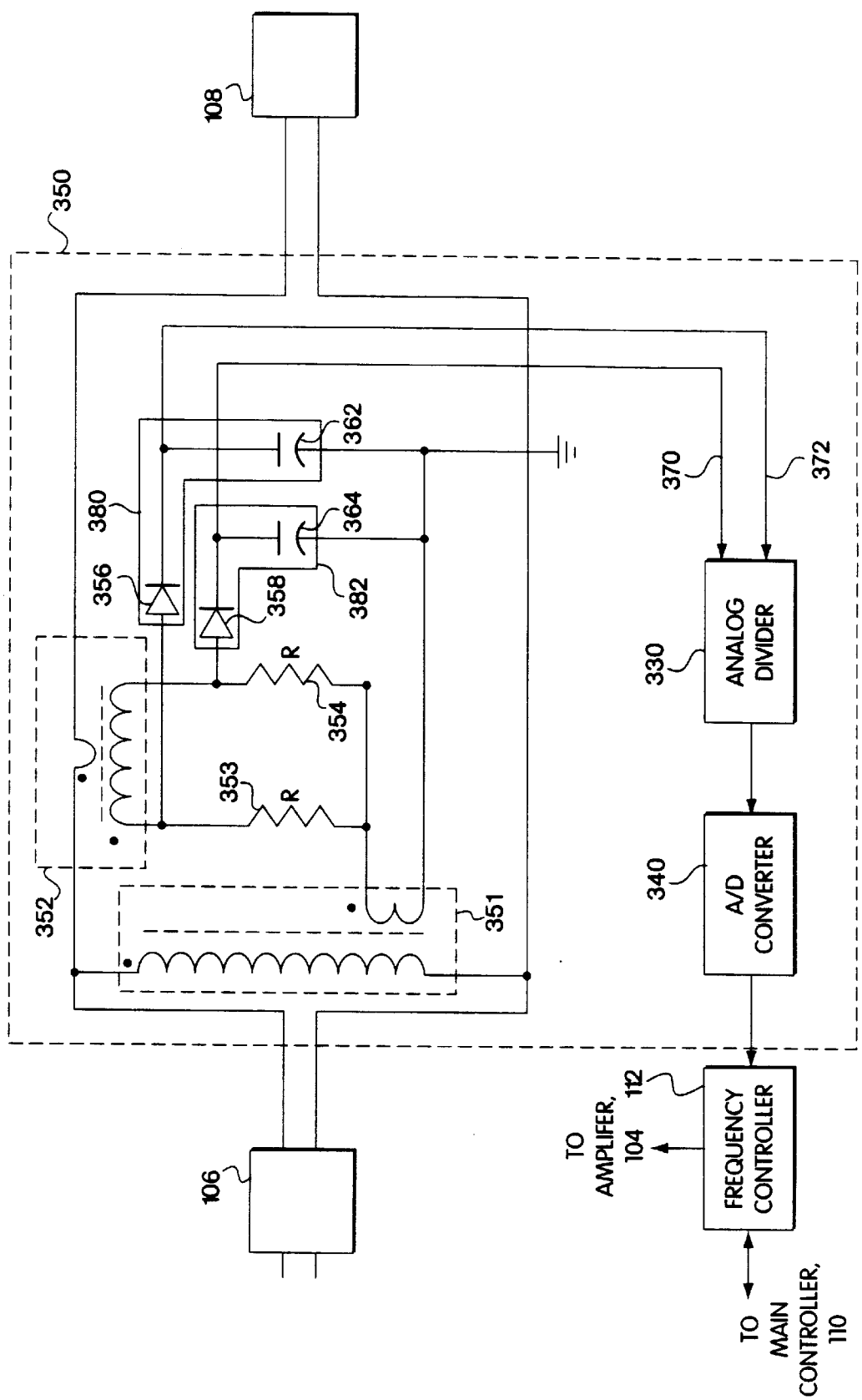
FIG. 3B illustrates a sensor according to a second embodiment.

FIG. 3B illustrates an alternative embodiment of sensor 114. In the alternative embodiment, sensor 114 is a reflected and forward power sensor. As shown in FIG. 3B, sensor 114, according to the alternative embodiment, includes a first transformer 350, a second transformer 352, a first resistor 353, a second resistor 354, a first peak detect circuit 380, and a second peak detect circuit 382.

The first peak detect circuit 380 includes a first diode 356 and a first capacitor 362 connected in series. The second peak detect circuit 382 includes a second diode 358 and a second capacitor 364 connected in series. The voltage across the first capacitor 362 represents the forward power and the voltage across the second capacitor represents the reflected power. The voltage across the first capacitor 362 and the voltage across the second capacitor 364 are fed into analog divider 330 by connections 372 and 370, respectively. The output of analog divider 330 is a signal representing the ratio of forward power to reflected power.

In one embodiment, the first transformer 350 has a primary to secondary turns ratio of X:1, and the second transformer 352 has a primary to secondary turns ration of 1:Y. The optimal resistance (R) for the first resistor 353 and the second resistor 354 is given by the following formula: $R = Y \times R_t / X$, where $R_t$ is the resistance of tank circuit 108.

When the frequency of the alternating voltage provided to the tank circuit 108 matches the tank circuit's resonant frequency, the reflected power is at a minimum point, the forward power is at a maximum point, and the ratio of reflected power to forward power is at a minimum point. This is true whether the tank circuit 108 is a parallel resonant tank circuit 108b or a series resonant tank circuit 108c. Consequently, the frequency controller 112 can use the ratio of the reflected power to the forward power, the reflected power, or the forward power to track the tank circuit's resonant frequency.

Process for heating a workpiece through induction.

Figure 5:
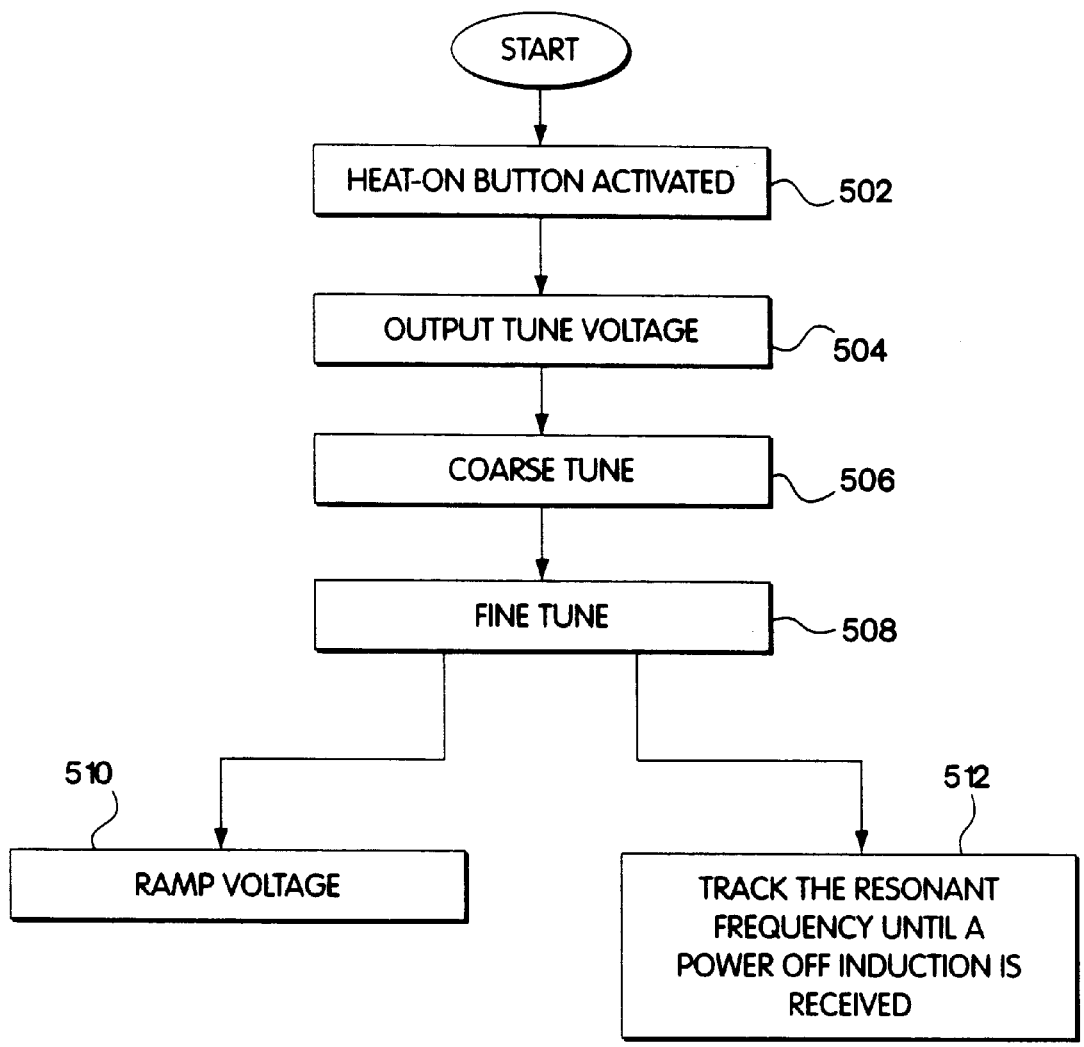
FIG. 5 is a flow chart illustrating a process for inductively heating a workpiece.

FIG. 5 is a flow chart illustrating a process for inductively heating a workpiece 109 placed within an inductor coil 113 of a tank circuit 108 using RF power supply 100. The process begins with step 502 when a user 117 activates a "heat-on" button (not shown) on the control panel 116, which sends a "heat-on" signal to the main controller 110. Upon receiving the "heat-on" signal, the main controller 110 begins the initial tuning process for determining a precise or "fine" estimate of the tank circuit's resonant frequency. The initial tuning process encompasses steps 504–508. In step 504, main controller 110 commands DC voltage source 102 to output a "tune" voltage. The "tune" voltage is the lowest voltage level that can provide a sufficient signal to measure the admittance, impedance, reflected power, or forward power of the tank circuit over a range of frequencies. The objective is to consume the least amount of energy during the initial tuning process. Typically, the "tune" voltage level is 5% of the full scale voltage, where the fill scale voltage is the voltage at which the workpiece is intended to be heated.

After step 504, control passes to step 506. In step 506, RF power supply 100 performs course tuning. That is, the RF power supply 100 determines a course (i.e., rough estimate) of the tank circuit's resonant frequency. The course estimate of the resonant frequency can be determined by sampling the tank circuit's admittance, impedance, reflected/forward power, etc . . . over a first predetermined frequency range. After step 506, control passes to step 508. In step 508, the RF power supply 100 performs fine tuning. That is, the RF power supply 100 determines a fine estimate (i.e., more precise estimate) of the tank circuit's resonant frequency. The fine estimate can be determined by sampling the tank circuit's admittance, impedance, reflected/forward power. etc . . . over a second frequency range, which includes the course estimate of the resonant frequency. After step 508, control passes to steps 510 and 512 in parallel. In step 510, the RF power supply 100 ramps (i.e., rapidly increases) the voltage output by the DC voltage source 102 such that within approximately 30 milliseconds the voltage increases from the "tuning" voltage level to approximately the full scale voltage level. In step 512, the RF power supply 100 continuously tracks the tank circuit's resonant frequency until a power off indication is received.

FIGS. 6A–7B further illustrate the process for inductively heating a workpiece 109 where the tank circuit 108 is a parallel resonant tank circuit 108b, sensor 114 is an admittance sensor, such as the one illustrated in FIG. 3A, and frequency controller 112 is implemented as shown in FIG. 2. It should be readily apparent to one skilled in the relevant art how to modify the processes illustrated in FIGS. 6A–7B for a series resonant tank circuit 108c and for other types of sensors, such as an impedance sensor or a power sensor.

Figure 6A:
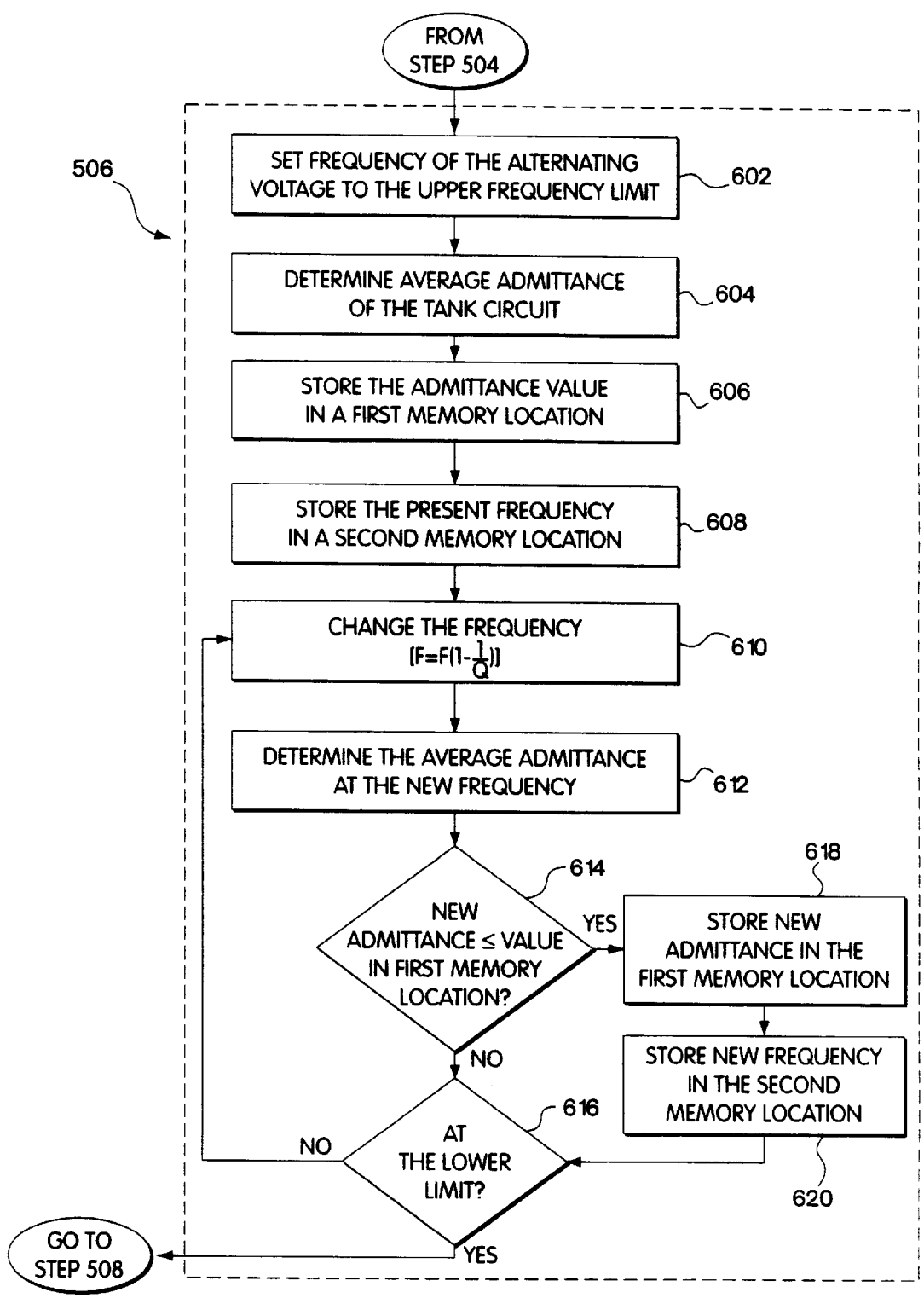
FIG. 6A illustrates a course tuning process according to one embodiment.

FIG. 6A further illustrates the course tuning process 506. The course tuning process 506 begins at step 602 where main controller 110 signals processor 202 to set the frequency of the alternating voltage produced by amplifier 104 to the upper frequency limit of the system. In one embodiment of the present invention, the power supply has an upper frequency limit of 485 KHz and a lower frequency limit of 50 KHz. In another embodiment, the upper frequency limit is 2 MHZ and the lower frequency limit is 515 KHz. In still another embodiment the upper frequency limit is 15 MHZ and the lower frequency limit is 2 MHZ. The invention, however, is by no means limited to these three embodiments. They are merely three examples of possible frequency ranges.

Next (step 604), after setting the frequency of the alternating voltage to the upper frequency limit, processor 202 reads the output of A/D converter 340 to determine an average admittance of tank circuit 108. The average admittance value determined by processor 202 is stored in a first memory location or register within processor 202 (step 606). This memory location is referred to as "minadmittance." The value of the frequency at which tank circuit 108 is being driven at is stored in a second memory location (step 608).

After step 608, control passes to step 610, where Processor 202 changes the frequency (F) of the alternating voltage to a new frequency according to the following formula: $F=F(1-1/Q)$, where Q is an estimate of the maximum quality factor (Q) for a given tank circuit 108. In the preferred embodiment, it is assumed that Q is equal to 100. Consequently, the formula for calculating the new frequency is: $F=(F)(0.99)$.

After changing the frequency, processor 202 reads the output of A/D converter 340 (step 612). The value read by processor 202 corresponds to the admittance value of tank circuit 108 at the new frequency (F). Processor 202 then compares this admittance to the value stored in min-admittance (step 614). If the admittance value is less than the value stored in min-admittance, then processor 202 stores the admittance value into min-admittance (step 618), thereby overwriting the value that was previously stored there, and stores the value of F into the second memory location (step 620). After step 620, control passes to step 616. Referring again to step 614, if the admittance value is greater than the value stored in min-admittance, then control immediately passes to step 616.

In step 616, processor 202 determines if it has reached the lower frequency limit, (i.e., the processor 202 determines if Fx0.99 is greater than the lower frequency limit). If the lower frequency limit has not been reached, control passes back to step 610, otherwise the course tuning process is complete and control passes to step 508. At the completion of the course tuning process the value stored in the second memory location contains a course estimate of the resonant frequency of tank circuit 108. It should be noted that the course tuning process could have begun at the lower frequency instead of at the upper frequency limit.

Figure 6B:
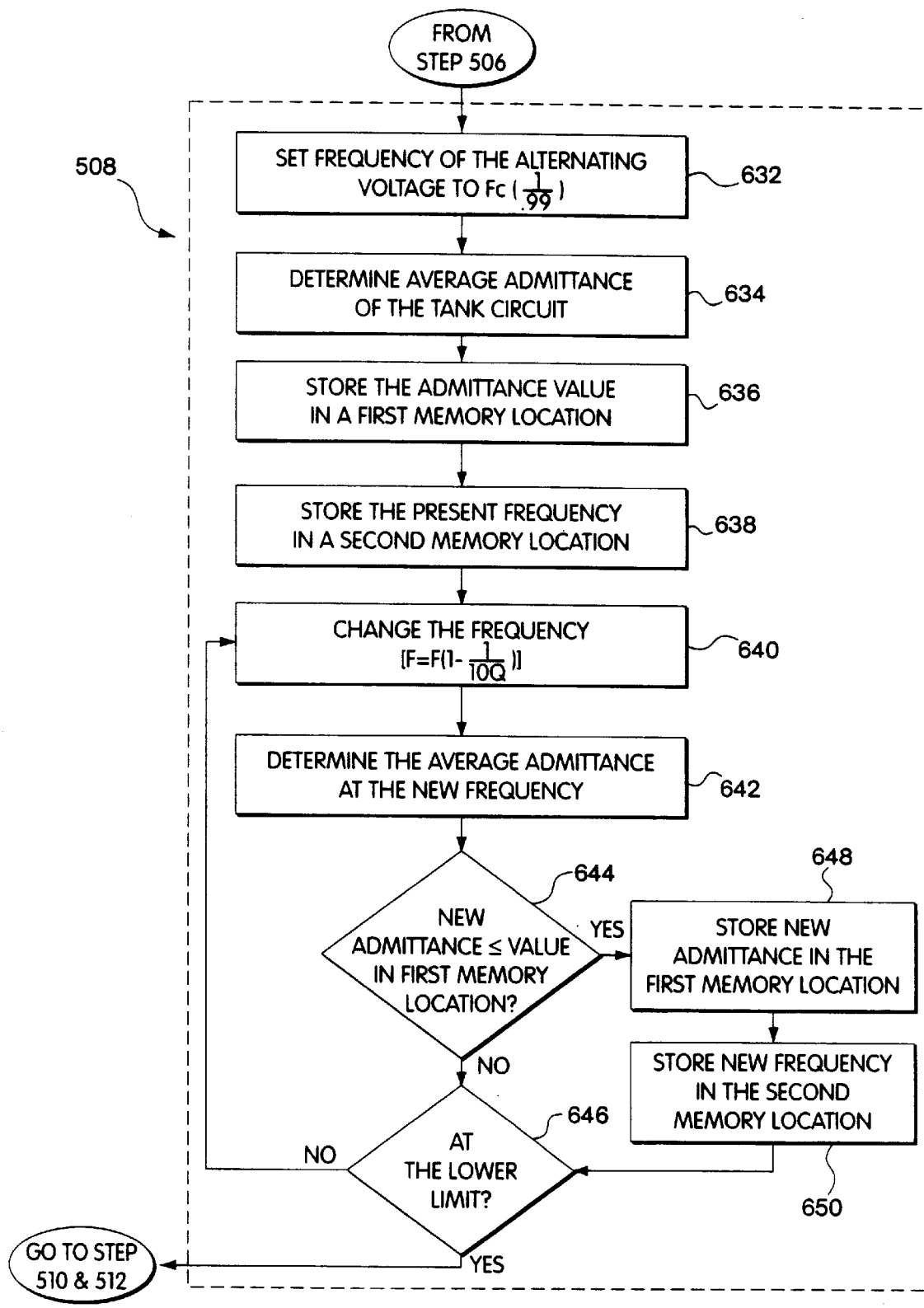
FIG. 6B illustrates a fine tuning process according to one embodiment.

FIG. 6B further illustrates the fine tuning process. The fine tuning process begins with step 632. In step 632, processor 202 sets the frequency of the alternating voltage produced by amplifier 104 to a frequency (F) determined by the following formula: $F=F_c \times (1/0.99)$, where $F_c$ is the course estimate of the resonant frequency. Next (step 634), processor 202 reads the output of AID converter 340 to determine an average admittance of tank circuit 108. The average admittance value determined by processor 202 is stored in a first memory location (step 636). The value of F, the frequency at which tank circuit 108 is currently being driven, is stored in a second memory location (step 638).

After step 638, control passes to step 640 where Processor 202 changes the frequency (F) of the alternating voltage to a new frequency according to the following formula: $F=F(1-1/(10 \times Q))$, where Q is an estimate of the maximum quality factor (Q) for a given tank circuit 108. In the preferred embodiment, it is assumed that Q is equal to 100. Consequently, the formula for calculating the new frequency is: $F=(F)(0.999)$.

After changing the frequency, processor 202 reads the output of AID converter 340 (step 642). The value read by processor 202 corresponds to the admittance value of tank circuit 108 at the new frequency (F). Processor 202 then compares this admittance to the value stored in the first memory location (step 644). If the admittance value is less than the value stored in min-admittance, then processor 202 stores the admittance value into the first memory location (step 648), thereby overwriting the value that was previously stored there, and stores the value of F into the second memory location (step 650). After step 650, control passes to step 646. Referring again to step 644, if the admittance value is greater than the value stored in the first memory location, then control immediately passes to step 646.

In step 646, processor 202 determines if it has reached the lower frequency limit. The lower frequency limit is defined as $F_c \times 0.99$, where $F_c$ is the course estimate of the resonant frequency. If the lower frequency limit has not been reached, control passes back to step 640, otherwise the fine tuning process is complete and control passes to steps 510 and 512 in parallel. At the completion of the fine tuning process the value stored in the second memory location contains the "fine" estimate of the resonant frequency of tank circuit 108.

FIG. 7A illustrates a resonant frequency tracking process 512 according to one embodiment. The process begins in step 702 where the processor 202 sets the frequency of the alternating voltage provided to the tank circuit 108 to the fine estimate of the resonant frequency determined in step 508. Next, the processor 202 measures the admittance, stores the admittance value in a first memory location (Ar), and stores the current frequency in a second memory location (Fr) (step 704). The frequency of the alternating voltage is then reduced by an offset set amount to F−, where F−=Fr−offset. (step 706). The offset amount can be a predetermined constant or it can be a function of frequency. Preferably, the offset is the latter and is determined by the following formula: offset=Fr×0.1%. After the frequency is changed, the processor 202 measures the admittance at the new frequency and stores the new admittance value in a third memory location (A−) (step 708). Next (steps 710 and 712), the frequency is changed to F+, where F+=Fr+offset, and a new admittance reading is taken and stored in a fourth memory location (A+).

Processor 202 uses the values stored in A−, Ar, and A+ to determine whether or not the present reference frequency, Fr, is the best estimate of the resonant frequency. If it is not the best estimate, processor 202 sets Fr to either F+ or F− depending on the relative magnitudes of A−, Ar, and A+. It is assumed that if Ar<A− and Ar<=A+, then Fr is the best approximation of the resonant frequency. In this case, processor 202 resets the frequency of the alternating voltage to Fr, measures the admittance at Fr, and stores the admittance value in Ar. In the case where A–<=Ar and A–<=A+, processor 202 sets Fr to F– and sets Ar to A–. Finally, in the case where A+<Ar and A+<A–, processor 202 changes the frequency of the alternating voltage to F+, sets Fr to F+, and sets Ar to A+. The above is accomplished in steps 714–728. In step 730, the processor determines whether a fault has occurred or whether the heat should be turned off. If either of those two conditions occur, control passes to step 732, where the process ends, otherwise control passes back to step 706.

FIG. 7B illustrates an alternative tracking process for tracking the tank circuit's resonant frequency. The process begins in step 751 where the RF power supply 100 sets the frequency (F) of the alternating voltage to the fine estimate of the resonant frequency determined in step 508. In step 752, "direction" is set to –1. In step 753, Fr is set to the fine estimate. In step 754, the admittance of the tank circuit is measured and the measured admittance value is stored in a first memory location. In step 756, the frequency (F) of the alternating voltage is changed such that: F=Fr+(Fr)(0.1%)(direction). In step 758, the admittance of the tank circuit is measured at the new frequency. In step 760, it is determined whether the new measured admittance value is less than or equal to the admittance value stored in the first memory location. If it is, then control passes to step 762, otherwise control passes to step 764. In step 762, the new measured admittance value is stored in the first memory location and Fr is set to F. After step 762, control passes back to step 756. In step 764, the "direction" is changed (i.e., direction=(direction)(–1). In step 766, the frequency of the alternating voltage is set to Fr. After step 766, control passes back to step 754. The process continues until a fault or heat off condition occurs.

As can be seen from the above described processes, the admittance of tank circuit 108 is continuously monitored throughout the entire heat on period. Based on the admittance of the tank circuit 108, the frequency of the alternating voltage is adjusted so that the frequency of the alternating voltage matches the resonant frequency of the tank circuit 108. In this manner, the desired amount of power is always delivered to the load 109. It should be apparent, however, to one skilled in the relevant how to modify the above described processes for an RF power supply that senses, among other things, impedance, forward power, and reflected power, as opposed to admittance.

While various embodiments of the present invention have been described above, it should be understood that they have been presented by way of example, and not limitation. It will be understood by those skilled in the art that various changes in form and detail may be made therein without departing from the spirit and scope of the invention as defined by the following claims. Thus the breadth and scope of the present invention should not be limited by any of the above-described exemplary embodiments, but should be defined only in accordance with the following claims and their equivalents.

What is claimed is:

1. A radio frequency (RF) power supply for providing RF power to a tank circuit coupled to an output of the RF power supply, comprising:
   a direct current (DC) voltage source;
   an amplifier, coupled to said DC voltage source, to provide an alternating voltage to the tank circuit;
   a frequency controller, coupled to said amplifier, to control a frequency of said alternating voltage provided by said amplifier; and
   an admittance sensor, coupled to the frequency controller and to the tank circuit, that produces a signal representative of the admittance of the tank circuit, wherein said admittance signal is provided to said frequency controller; and
   said frequency controller uses said admittance signal to modify said frequency of said alternating voltage so that said frequency of said alternating voltage tracks a resonant frequency of the tank circuit.

2. The RF power supply of claim 1, wherein said admittance sensor comprises
   a current sensor that provides a current signal that represents the amount of the current provided to the tank circuit;
   a voltage sensor that provides a voltage signal that represents the amount of voltage applied to the tank circuit; and
   a divider that receives said voltage signal and said current signal and produces said admittance signal that represents the admittance of the tank circuit.

3. A method for inductively heating a workpiece, comprising the steps of:
   generating an alternating voltage having a first frequency;
   providing said alternating voltage to a tank circuit;
   generating a first admittance signal that represents the admittance of the tank circuit at said first frequency;
   setting said frequency of said alternating voltage to a second frequency;
   generating a second admittance signal that represents the admittance of the tank circuit at said second frequency;
   comparing the magnitude of said first admittance signal to said second admittance signal; and
   modifying said frequency of said alternating voltage as a function of a result of said comparison so that said frequency of said alternating voltage tracks a resonant frequency of the tank circuit.

4. A method for inductively heating a workpiece placed in proximity to an inductor coil of a tank circuit, wherein the tank circuit has a resonant frequency, comprising the steps of:
   applying an alternating voltage to the tank circuit, said alternating voltage having a frequency, and said alternating voltage having a first voltage level;
   determining a coarse estimate of the resonant frequency of the tank circuit;
   based on said coarse estimate, determining a fine estimate of the resonant frequency of the tank circuit;
   setting said frequency of said alternating voltage to said fine estimate of said resonant frequency;
   increasing said voltage level of said alternating voltage from said first voltage level to a second voltage level after setting said frequency of said alternating voltage to said fine estimate of said resonant frequency; and
   while said voltage level is being increased and until a heat off indication is generated, modifying said frequency of said alternating voltage so that said frequency of said alternating voltage tracks the resonant frequency of the tank circuit.

5. The method of claim 4, wherein said step of determining a coarse estimate of the resonant frequency comprises the steps of:
   setting said frequency of said alternating voltage to a first frequency;
   storing a value representing said first frequency;
   determining an admittance value of the tank circuit at said first frequency;

changing said frequency of said alternating voltage by an offset amount;

determining an admittance value of the tank circuit at the new frequency;

comparing said admittance value of the tank circuit at the new frequency to said admittance value of the tank circuit at said first frequency;

if the tank circuit is a series resonant tank circuit and said admittance value of the tank circuit at the new frequency is greater than said admittance value of the tank circuit at said first frequency, storing a value representing said new frequency of said alternating voltage;

if the tank circuit is a parallel resonant tank circuit and said admittance value of the tank circuit at the new frequency is less than said admittance value of the tank circuit at said first frequency, storing a value representing said new frequency of said alternating voltage.

6. The method of claim 4, wherein said step of modifying said frequency of said alternating voltage so that said frequency of said alternating voltage tracks the resonant frequency of the tank circuit comprises the steps of:

(1) setting said frequency of said alternating voltage to a predetermined frequency;

(2) determining an admittance of the tank circuit at said predetermined frequency;

(3) setting said frequency of said alternating voltage to F+, where F+ equals said predetermined frequency plus a first offset amount;

(4) determining said admittance of the tank circuit at said F+ frequency;

(5) setting said frequency of said alternating voltage to F−, where F− equals said predetermined frequency minus a second offset amount;

(6) determining said admittance of the tank circuit; and (7) changing said frequency of said alternating voltage based on said admittance determined in step (2), said admittance determined in step (4), and said admittance determined in step (6).

7. The method of claim 4, wherein said step of modifying said frequency of said alternating voltage so that said frequency of said alternating voltage tracks the resonant frequency of the tank circuit comprises the steps of:

(1) determining an admittance of the tank circuit and storing said admittance in a first memory location;

(2) decreasing said frequency of said alternating voltage;

(3) determining said admittance of the tank circuit;

(4) comparing said admittance stored in said first memory location with said admittance determined in step (3);

(5) if said admittance determined in step (3) is less than or equal to said admittance stored in said first memory location, storing said admittance determined in step (3) in said first memory location, and returning to step (2), otherwise continuing to step (6);

(6) increasing said frequency of said alternating voltage;

(7) determining said admittance of the tank circuit and storing said admittance in said first memory location;

(8) increasing said frequency of said alternating voltage;

(9) determining said admittance of the tank circuit;

(10) if said admittance determined in step (9) is less than or equal to said admittance stored in said first memory location, storing said admittance determined in step (9) in said first memory location, and returning to step (8), otherwise continuing to step (11); and

(11) decreasing said frequency of said alternating voltage and returning to step (1).

8. A method for inductively heating a workpiece placed in proximity to an inductor coil of a tank circuit, comprising the steps of:

(1) applying an alternating voltage to the tank circuit, said alternating voltage having a frequency;

(2) determining an admittance of the tank circuit;

(3) increasing said frequency of said alternating voltage;

(4) determining said admittance of the tank circuit;

(5) comparing said admittance determined in step (2) with said admittance determined in step (4);

(6) if said admittance determined in step (4) is less than said admittance determined in step (2), then increasing said frequency of said alternating voltage, otherwise decreasing said frequency of said alternating voltage.

9. A method for inductively heating a workpiece placed in proximity to an inductor coil of a tank circuit, comprising the steps of:

(1) applying an alternating voltage to the tank circuit, said alternating voltage having a frequency;

(2) determining an admittance of the tank circuit at said frequency;

(3) setting said frequency of said alternating voltage to F+, where F+ equals said frequency plus a first offset amount;

(4) determining said admittance of the tank circuit at said F+ frequency;

(5) setting said frequency of said alternating voltage to F−, where F− equals said frequency minus a second offset amount;

(6) determining said admittance of the tank circuit; and (7) changing said frequency of said alternating voltage based on said admittance determined in step (2), said admittance determined in step (4), and said admittance determined in step (6).

10. A method for inductively heating a workpiece, comprising the steps of:

applying an alternating voltage to a tank circuit, the alternating voltage having a frequency and a first voltage level, the tank circuit having an initial resonant frequency;

determining a coarse estimate of the initial resonant frequency of the tank circuit;

based on the coarse estimate, determining a fine estimate of the initial resonant frequency of the tank circuit;

setting the frequency of the alternating voltage to the fine estimate of the resonant frequency;

increasing the voltage level of the alternating voltage from the first voltage level to a second voltage level after determining the fine estimate of the resonant frequency; and while the voltage level is being increased and until a heat off indication is received, modifying the frequency of the alternating voltage so that the frequency of the alternating voltage tracks the resonant frequency of the tank circuit.

11. The method of claim 10, further comprising the step of ceasing applying the alternating voltage to the tank circuit after receiving the heat off indication.

* * * * *